United States Patent [19]

Buckley et al.

[11] Patent Number: 4,870,623

[45] Date of Patent: Sep. 26, 1989

[54] SYSTEM TO RECOGNIZE A GEOMETRY PARAMETER OF UNKNOWN OBJECT WITH CONTINUOUS WAVE ACOUSTIC ENERGY

[75] Inventors: Bruce S. Buckley; Roy H. Reichwein, both of San Jose; Steven W. Brown, Sunnymead, all of Calif.

[73] Assignee: Cochlea Corporation, San Jose, Calif.

[21] Appl. No.: 508,123

[22] Filed: Jun. 27, 1983

[51] Int. Cl.$^4$ ............................................. G01S 15/02
[52] U.S. Cl. ....................................... 367/7; 367/103
[58] Field of Search .................. 367/7, 8, 11, 87, 99, 367/100, 103, 104, 123, 126, 151, 902; 73/602, 628; 364/550

[56] References Cited

U.S. PATENT DOCUMENTS

| | | | |
|---|---|---|---|
| 3,438,493 | 4/1969 | Goble | 209/590 |
| 3,506,953 | 4/1970 | Rudy | 367/105 |
| 3,679,020 | 7/1972 | Sondhi | 367/7 |
| 3,717,843 | 2/1973 | Farrah et al. | |
| 3,719,922 | 3/1973 | Lopes, Jr. et al. | 367/11 |
| 3,736,552 | 5/1973 | Sessler et al. | 367/7 |
| 3,747,753 | 7/1973 | Flint | 209/555 |
| 3,757,285 | 9/1973 | Ferré | 367/96 X |
| 3,794,964 | 2/1974 | Katakura | 367/103 |
| 3,803,606 | 4/1974 | Lebail et al. | 367/8 X |
| 3,804,270 | 4/1974 | Michaud et al. | 209/939 X |
| 3,804,470 | 4/1974 | Michaud et al. | 209/564 X |
| 3,818,425 | 6/1974 | Peynaud et al. | 367/902 X |
| 3,918,297 | 11/1975 | Rocha | 367/87 X |
| 3,975,261 | 8/1976 | Beck | 209/590 X |
| 4,030,062 | 6/1977 | Diehl et al. | 367/103 |
| 4,049,123 | 9/1977 | Fegley et al. | 209/555 |
| 4,050,056 | 9/1977 | Massa | 367/151 |
| 4,112,411 | 9/1978 | Alais et al. | |
| 4,146,869 | 3/1979 | Snyder | 367/99 |
| 4,164,873 | 8/1979 | Böttcher et al. | 73/643 |
| 4,169,257 | 9/1979 | Smith | 367/905 X |
| 4,173,007 | 10/1979 | McKeighen et al. | 367/103 |
| 4,209,853 | 6/1980 | Hyatt | 367/11 |
| 4,221,004 | 9/1980 | Combs et al. | 367/902 X |
| 4,223,790 | 9/1980 | Yoshida | 209/590 |
| 4,274,421 | 6/1981 | Dory | 367/151 |
| 4,280,354 | 7/1981 | Wheeler et al. | 367/99 |
| 4,287,769 | 9/1981 | Buckley | 364/550 |
| 4,326,155 | 4/1982 | Griebeler | 367/96 X |
| 4,364,264 | 12/1982 | ReFiorentin | 367/99 |
| 4,368,641 | 1/1983 | McCleod | |
| 4,557,386 | 12/1985 | Buckley et al. | |
| 4,576,286 | 3/1986 | Buckley et al. | |

OTHER PUBLICATIONS

IBM Bulletin No. 8, Jan. 1976.
IBM Technical Disclosure Bulletin, vol. 18, No. 8, pp. 2665-2667, Affinito et al., Jan. 1976.

Primary Examiner—Thomas H. Tarcza
Assistant Examiner—Daniel T. Pihulic
Attorney, Agent, or Firm—Robert Shaw

[57] ABSTRACT

An acoustic sensing system to measure a geometry parameter such as, for example, position, orientation and/or shape of an object. The system includes a transmitter for transmitting acoustic wave energy at a single frequency, which acoustic wave energy, in an operating system, interacts with the object in a sensing region to provide reflected or scattered wave energy. A sensor mechanism consisting of many acoustic transducers is positioned to receive the reflected or scattered wave energy, each transducer being operable to convert the received acoustic wave energy to an electrical signal. A processor is connected to receive the electrical signals from the plurality of acoustic transducers; the processor is operable to obtain amplitude and phase information with respect to the electrical signal from each of the transducers, the amplitude and phase information from each of the plurality of transducers being combined and analyzed to derive a geometric parameter of the object.

42 Claims, 7 Drawing Sheets

SYSTEM TO RECOGNIZE A GEOMETRY PARAMETER OF UNKNOWN OBJECT WITH CONTINUOUS WAVE ACOUSTIC ENERGY

BACKGROUND OF THE INVENTION

The present invention relates to systems to determine a geometry parameter of an unknown object.

Attention is called to U.S. Letters Patent of the Inventor B. Shawn Buckley herein: U.S. Pat. Nos. 4,095,475; 4,200,921; and 4,287,769.

In manufacturing, the majority of parts produced are done by a process called batch manufacturing. Batches of parts from 50 to perhaps 1000 are processed at one time. Batch processing which represents 75% of the dollar value of all parts manufacturing, is economically appropriate for those parts which are made in volumes of less than a million parts per year. However, batch processing is a labor intensive method which necessarily means the cost per unit is relatively high compared to automated parts manufacturing or, "hard automation".

In hard automation, part volumes are high enough that a machine can be specially built and dedicated to the manufacture of a particular part. Usually a million or more parts per year are needed to economically justify such a dedicated machine. It is called hard automation because "hard" tooling is needed to manufacture a particular part. If the design of a part should change, often another machine must be built to automate its manufacture even for relatively minor changes in the design. Despite the drawback of requiring special-purpose machines for each part design, hard automation remains the most economical method of manufacturing when millions of a part are to be made.

"Soft" automation is an attempt to apply hard automation principles to batch processing: it replaces the "hard" tooling with electronic computers. The computers can be quickly reprogrammed to manufacture a part of a different design without performing the task manually or redesigning the machine that makes the part. In metal cutting, "soft" automation incorporates numerically controlled (NC) lathes and milling machines. In warehousing, it incorporates automated retrieval systems. In paint spraying and spot welding, it incorporates industrial robots. On the factory floor it incorporates programmable controllers.

However, in parts handling and assembly systems the versatility of "soft" automation has not been realized. True, industrial robots can be programmed to manipulate a part in enormously complicated ways once given a part to manipulate. But unfortunately, it has no versatile way of obtaining the parts in the first place. Each robot comes equipped with custom-tooled parts feeders-whose cost is typically three to five times the cost of the robot itself. These parts feeders, the dominant cost in a robot parts handling system, must be custom designed and installed for each part a robot manipulates. Thus the robot becomes a mere accessory to what is essentially a hard automation system. While the robot may be versatile enough to handle a variety of parts, the systems to which it is coupled are not.

Vision systems are an attempt by "soft" automation experts to couple the robot to the parts that it must handle. Unfortunately, these systems are expensive compared to manual methods. Although they hold the promise of enabling a robot to feed its own parts, presently they are not a practical method of doing so. A versatile, low-cost method of allowing a robot to grasp parts which it manipulates is required.

Acoustic systems exist which determine some information about objects which a robot is to grasp. These systems use either "pulsed" methods or "continuous wave frequency modulated" (CWFM) methods. The pulsed methods send out a "pulse" of sound followed by a silent period during which a receiver listens for the reflected sound pulse from the object. By measuring the delay time between send and receive, the distance to an object can be measured. An acoustic range-finder camera made by Polaroid Corporation of Cambridge, Mass., uses such a principle to determine the distance between the camera and nearby objects for focusing purposes. While such devices can detect an object's proximity, its shape cannot be determined without scanning an object (physically moving the sound source to points at various parts of the object). Moreover, reflections from jigs and fixtures, common in industrial parts handling, can be detected rather than the reflections from the object. It will be noted that most pulsed acoustics (e.g., the acoustic tomography associated with medical ultrasound applications) inherently uses a liquid medium which is not appropriate for robots grasping objects in an industrial setting.

CWFM is a technique using continuous acoustic waves whose frequency varies over a broad range. The sound waves are transmitted toward an object and reflections received by appropriate transducers. The reflected signals are electronically mixed with the transmitted signal and then translated into the frequency domain, usually by an FFT (fast Fourier transform) algorithm. In this procedure, objects close to the transducers give a response at low frequency while objects further from the transducers give a high frequency response. Acoustic CWFM in air has been developed primarily in New Zealand where it is used as an aid for the blind (D. Rowell "Auditory Display of Spatial Information", PH.D. Thesis, University of Caterbury, Christchurch, New Zealand, 1970). It holds promise as a method by which a robot can grasp an object. Indeed, bats use such a technique for locating flying insects in total darkness.

The present invention uses continuous wave (CW) at a single frequency as opposed to the pulsed technique or the variable frequency continuous wave technique. By operating at a single frequency, digital and analog filtering techniques can be employed which give higher accuracy measurements than the other acoustic techniques. Moreover, transducers which operate at a single frequency are easier to construct than broad band transducers which must operate over large frequency bands, as in CWFM, and, in some cases, in pulsed acoustics.

The present invention can be used for imaging an object in an unstructured environment. "Unstructured", in this case means that the environment is not known ahead of time. By contrast, the previous applications of CW acoustics, discussed in the Buckley U.S. Pat. Nos. 4,095,475; 4,200,921 and 4,287,769, were in the context of "structured" environments where objects were previously known and only small variations of those objects were measured. The present invention is a method by which an array of acoustic transducers is implemented in automated manufacturing systems using industrial robots and the like, where at least some parts of the object or environment are not known beforehand.

The issue of "structured" and "unstructured" environments is a vague one and can best be explained in relation to how far an object is from its "expected" position, or how far it has changed from its "expected" shape. Since the position, orientation and shape of an object all affect the acoustic measurements in a similar way, henceforth only position will be referred to, but with the understanding that shape and orientation (also called geometry parameters or characteristics herein) changes are included. A "structured" environment, in this context, means that all objects are close to their expected position: an "unstructured" environment is one where objects might be at any position, previously unknown. In the Buckley patents, wave measurements are compared to previous measurements of a standard or reference object. Hence, the environment is structured because only variations in the position of the standard object are measured.

OBJECTIVES OF THE INVENTION

An objective of the present invention is to provide position and dimension information for automated manufacturing equipment in which the exact position, shape or orientation of an object is not known beforehand. These techniques are generally called imaging or unstructured environment techniques as will be explained in detail. These techniques rely on two different acoustic phenomenons: phased arrays which can selectively direct or receive acoustic information primarily from certain regions and differential acoustic measurements which provide more smoothly varying information useful in certain applications.

Another objective of the invention is to provide a method for analyzing information obtained using an array of acoustic transducers to obtain geometric parameters of objects in unstructured environments.

Yet another objective of the invention is to provide certain apparatus which improves the ability of the array of transducers to obtain geometric parameters of objects in unstructured environments.

These and still further objectives are addressed hereinafter.

The foregoing objects are achieved, generally, by an acoustic sensing system that includes: means for transmitting acoustic wave energy at a single frequency (or very narrow band of frequencies), which acoustic wave energy, in an operating system, interacts with an object in a sensing region to provide scattered wave energy; sensing means comprising a plurality of acoustic transducers positioned to receive the scattered wave energy; each transducer being operable to convert the received acoustic wave energy to an electrical signal; means for processing connected to receive the electrical signals from the plurality of acoustic transducers and operable to obtain amplitude and phase information from each of the plurality of transducers to derive a geometric parameter of the object.

The invention is hereinafter described with reference to the accompanying drawing in which.

The following discussion concerns unstructured environments and methods for determining the position of an object, orientation or the shape of an object where these are not known beforehand. However, the procedure for detecting unknown objects is similar to that for measuring position, orientation or shape changes (as above indicated, all are included in the context of the term "geometric parameter" herein) in known objects. Now follows a brief discussion of the technique by which a computer determines the geometric parameters of a known object whose geometry (i.e., shape, orientation, position or some other physical condition) change only slightly from learned objects. First, a brief review of the disclosure in the prior patents of the present inventor is appropriate, as the data acquisition apparatus for the present invention is similar to that of the prior patents.

Figure 1:
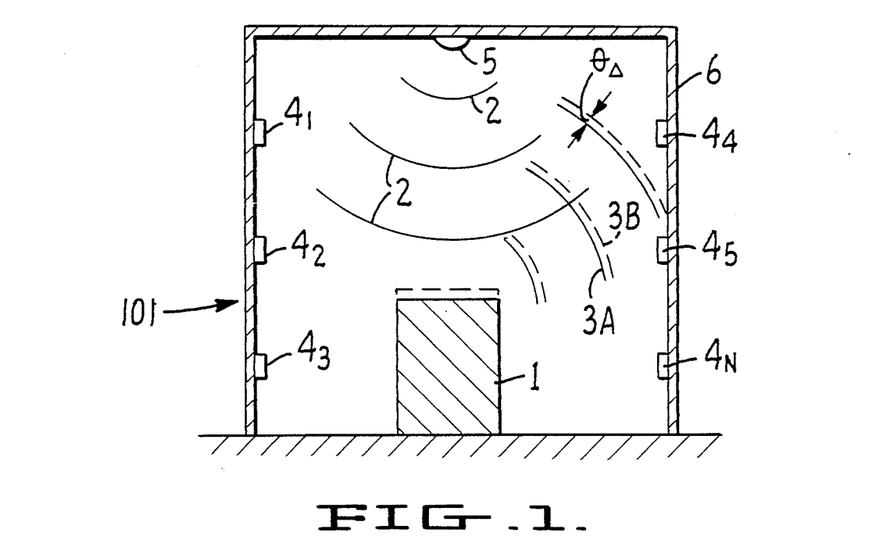
FIG. 1 is a side section view diagrammatic in form, of a portion of a system adapted to recognize or define a geometry parameter of an object.

Referring now to the figures, apparatus for inspecting manufactured parts and the like is shown at 101 in FIG. 1. The system 101 is acoustic. In FIG. 1, the object labeled 1 is a standard or master, but it is, for present purposes, also a sample part (i.e., a part to be inspected). The system 101 is calibrated using a standard part and then the sample part replaces the standard. The solid outer lines of the object 1 represent the dimensions of the standard and the broken upper line represents a sample that has a slightly larger height than the standard, but the same width. Acoustic wave energy is labeled 3A and 3B (the latter being dotted) to represent the reflected wave energy from the standard part and the sample part, respectively. The space between the waves 3A and 3B represents a phase shift difference and is indicated to be such; that phase shift difference is detected and recorded, as hereinafter explained, and is represented by the designation $\theta_\Delta$ hereinafter. It will be noted, however, that the phase shift is but one of the wave characteristics which may be employed; other wave characteristics included wave amplitude or combinations of wave phase and wave amplitude.

Figure 2:
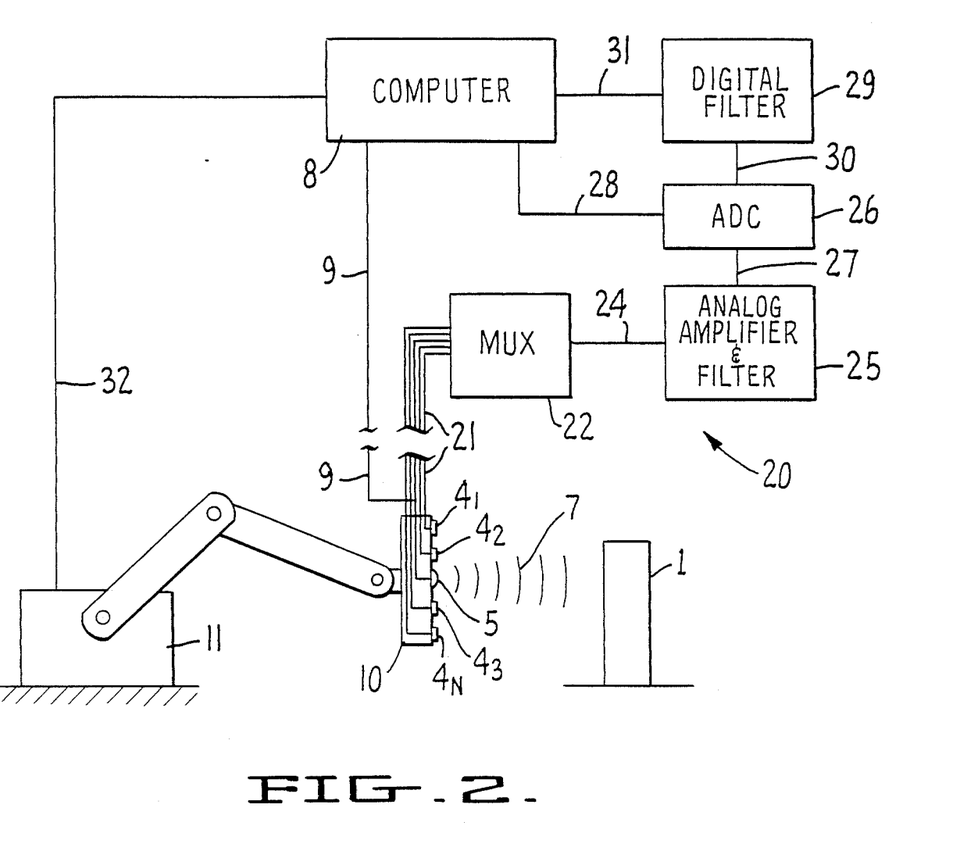
FIG. 2 is a diagrammatic representation of a system to recognize a geometry parameter of an object and including an acoustic transmitter and an array of acoustic receivers.

The original wave energy 2 is emitted by an acoustic transducer 5 which may be a speaker and the energy is at a single wavelength. In the preferred form of the invention, the phase of the reflected wave energy 3A is compared with the original wave energy 2 and any phase difference $\theta_B$ therebetween is noted to establish an acceptable standard; for inspection purposes, the phase of the reflected wave energy 3B is compared with the original wave energy 2 and any phase difference $\theta_A$ therebetween is compared with the phase difference $\theta_B$ to determine any difference $\theta_\Delta$ therebetween. A maximum value of the difference $\theta_\Delta$ is established as the value that cannot be exceeded for the sample part to be acceptable. Sensing of the reflected waves is effected by wave receivers or microphones $4_1 \ldots 4_N$. The part 1, the transducer 5 and the receivers $4_1 \ldots 4_N$ are all housed within chamber 6. The emitter 5 sends out waves of constant frequency which are reflected from the part 1 and the interior of the chamber 6 and then picked up by the receivers $4_1 \ldots 4_N$. The electrical circuitry to energize the speaker and the microphones, the analyzing circuitry, and so forth, are shown in FIG. 2 and are discussed later; but first there is an explanation of the concepts underlying the present invention.

As a result of the constant (or single) frequency wave emission, the input to the receivers $4_1 \ldots 4_N$ will be a sinusoidal signal of the same frequency as the emitted wave but differing in both amplitude and phase. Inspection of the part 1 is possible by monitoring the amplitude and phase differences between emitted and received waves, as above indicated and as now explained in detail. For clarity, only the phases of waves will be used in the explanation, although the amplitude and combinations of amplitude and phase are equally valid.

First, a master workpiece or standard part 1 is positioned at the inspecting station and enclosed by the inspection chamber. The phase monitored at each receiver $4_1 \ldots 4_N$ consitutes the phase vector of the master workpiece:

$$\bar{\theta} = (\theta_1, \theta_2, \theta_3 \ldots \theta_N) \quad (1)$$

A subsequent or sample part to be inserted is positioned at the same point and orientation, and a similar phase vector $$\bar{\theta}' = (\theta_1', \theta_2' \ldots \theta_N') \quad (2)$$

is monitored for the part. The difference in phase between the master workpiece and the part is found by the expression $$\bar{\theta} = (\theta_1 - \theta_1', \theta_2 - \theta_2' \ldots \theta_N - \theta_N') \quad (3)$$

which can be used to determine whether a sample part is within tolerances, whether it is not, and by how much. (In this description and in the appended claims, the designation $\theta_A$ is used to denote any one of the phase vectors or differences $\theta_1', \theta_2' \ldots \theta_N'$. The designation $\theta_B$ is used to denote any one of the phase vectors of differences $\theta_1, \theta_2 \ldots \theta_N$. The designation $\theta_\Delta$ is any difference between $\theta_A$ and $\theta_B$.)

In the Buckley U.S. Pat. No. 4,200,921, an electrical circuit is used which detects only phase relationship for the various receivers $4_1 \ldots 4_N$. Here, by changing the electrical circuitry, both amplitude and phase information is obtained. FIG. 2 shows an array 10 of transducers $4_1 \ldots 4_N$ which receive acoustic wave energy reflected from an object 1. A wave energy transmitter 5 sends single frequency continuous acoustic wave energy whose frequency is determined by a computer 8 and whose analog signal is sent to the transmitter via the connection marked 9; the computer 8 and other electrical circuitry are collectively designated 20.

In FIG. 2 the array 10 is attached to an industrial robot 11 which allows the array 10 to be moved in relation to the object 1. In general, the array 10 would additionally have a gripper (not shown) with which to manipulate the object 1. Consider a robot 11 grasping an object whose position or shape is not known beforehand—a typical unstructured environment task. For example, the object 1 might be a glass and the robot might be a prosthetic robot 11 used by a paraplegic; the grasping maneuver is one in which feedback to the robot of position and shape information about the glass is particularly important.

Now follows a description of the electronic system 20 for processing received signals at 21 into amplitude and phase information for subsequent analysis by the computer 8. As previously discussed, the signals at 21 are sinusoidal analog signals detected by the receivers $4_1 \ldots 4_N$. The signals are fed to a multiplexor 22 (via the connections 21) where one of the signals is chosen by the computer 8 to be analyzed. The connection shown at 23 is a bus by which the computer 8 signals the multiplexor 22 to establish which of the signals on connections 21 is chosen. The chosen sinusoidal signal from the sensors $4_1 \ldots 4_N$ is fed via connection 24 to an analog amplifier and filter 25 which amplifies or attenuates the signal (as required) and reduces noise at frequencies other than the sinusoidal operating frequency of the transmitted wave energy.

Next, the signal is converted to a digital value in an analog-to-digital converter (ADC) 26. The filtered sinusoidal signal transmitted on connection 27 is sampled at various time intervals as determined by a clock signal fed to the ADC 26 by the computer 8 via connection 28. The sampled values are sent to a digital filter 29 (via bus 30) where they are further filtered to remove noise at frequencies other than the transmitted wave energy frequency. Lastly, the filtered data is transmitted to the computer 8 via bus 31 for analysis. An analysis of the filtered data first requires that the data be converted to amplitude and phase information of the received wave energy for the chosen sensor $4_1 \ldots 4_N$. A Fourier transform algorithm, available in the literature, readily converts the digital values to amplitude and phase information.

Note that in high performance systems which must operate at higher measurement rates, some of the elements shown may be duplicated to allow their tasks to be done in parallel. For example, a system which had two each MUX 22, analog filters 25, ADC 26 and digital filters 29 could make measurements twice as fast as the system 20.

The computer 8, then, orchestrates the data gathering sensors $4_1 \ldots 4_N$. First, it transmits the operating frequency to the transmitter 5; then it directs one after another of the received sensor signals output from the MUX 22 to the filter 25. The computer 8 also determines the timing and the duration of the data sampling in the ADC 26 and, further receives and analyzes the amplitude and phase information from the digital filter 29. Each sensor signal in turn is so processed; the computer 8 also stores the amplitude and phase information from previously processed sensor signals until all sensors $4_1 \ldots 4_N$ in the array 10 have been processed. Lastly, the computer 8 sends signals to the robot 11 or other equipment via bus 32, based on phase and amplitude information which it interprets from the sensor signals. Such a closed loop system for detecting the position of objects in a structured environment was reported in the literature by one of the present inventors ("Automated Positioning and Assembly Under Microcomputer Control Via Acoustic Phase Monitoring", J. Tavormina, S. Buckley, *Transactions of the Society of Manufacturing Engineering*, Vol. 6, 1978). Now follows techniques for accomplishing the same result in unstructured environments.

In an unstructured environment, essentially the receivers "scan" the environment by focusing (or directing) on one point after another. Focusing uses a technique called "phase arrays" which are now described in detail with reference to the diagram of FIG. 3 which renders an array of receivers $4D_1 \ldots 4D_N$ at a distance from an object 1D. In general the X-distance between array $4D_1 \ldots 4D_N$ and object 1D is no more than ten times the Y-distance between the outermost ends of the array (i.e., the distance between the receivers $4D_1$ and $4D_N$). Often the array-object separation distance is on the same order of magnitude as the array size. This is in contrast to phased arrays used in radar, for example, where the array-object distances are much, much greater than the array size. While the present technique is generally applicable to three dimensional position, orientation or shape measurement, for clarity, only two-dimensional focusing will be explained.

To "focus" at a point F in FIG. 3, it is necessary that the wave energy emanating from point F constructively interferes, that is, each receiver $4D_1 \ldots 4D_N$ receives its signal at the same time, and the phase shifted signals are subsequently combined or summed together. Focusing at the point F could be achieved, for example, by moving the receivers $4D_1 \ldots 4D_N$ into an arc about the point F such that any acoustic signal coming from F would reach all the receivers at the same time, assuming a uniform propagation medium 200. The receivers $4D'_1, 4D'_2 \ldots 4D'_N$ (shown dotted in FIG. 3) are located at a distance equi-distance from the point F.

However, physically moving the receivers to various positions as focusing occurs at different points F is unwieldly. In phased array radar, the electrical signals received at each receiver are electrically shifted in phase an amount so that the receiver's "apparent" position is equi-distance from an object. As mentioned before, in radar the array-object distances are very large so the apparent receiver positions are along a straight line rather than an arc. Hence focusing in radar is much easier: the phase shift between any two adjacent receivers is the same and simple delay lines are implemented to shift the phase of the electrical signals prior to combining them.

In the present invention, the object-array distance is on the order of the array size; hence the phase shift between any two adjacent receivers is not the same. In one aspect of the present invention, focusing is achieved by processing rather than by physically combining the electrical signals of the receivers $4D_1 \ldots 4D_N$ or by physically moving the receivers $4D_1 \ldots 4D_N$. In phased array radar, this is not presently possible since the Megahertz operating frequencies of radar are too high to allow processing time on even the fastest computers. In acoustics, however, typically operating at less than 100 KHZ current electronic hardware allows acquisition of the received wave characteristics as shown with regard to FIG. 3.

Figures 3, 4, 5A, 5B:
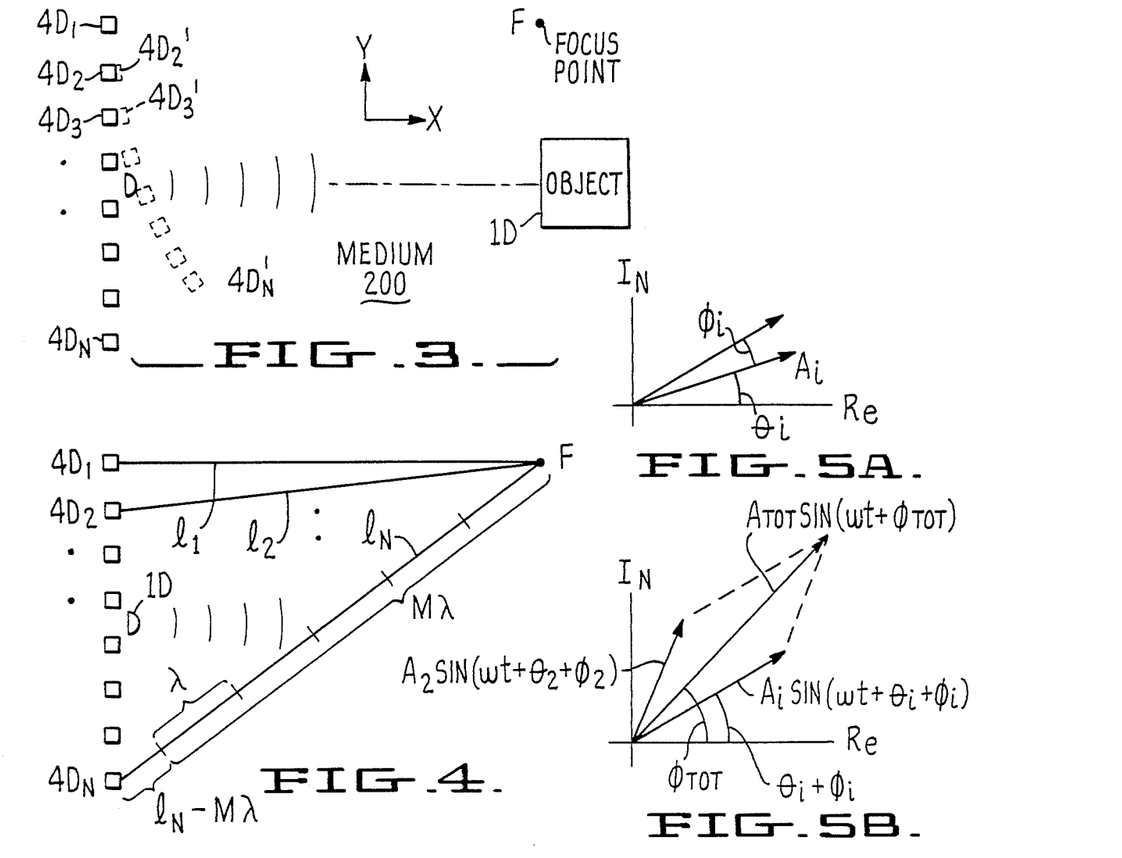
FIGS. 3 and 4 show diagrammatically forms the transmitter and receiver can take.
FIGS. 5A and 5B show phasor representatives of signals in polar coordinates.

Given the amplitude and phase measurements (i.e., $A_1 \ldots A_N$ and $\theta_1 \ldots \theta_N$) for the array of microphones $4D_1 \ldots 4D_N$, the portion of the signal emanating from the point F in FIG. 3 can be determined. First, the distance between each receiver $4D_1 \ldots 4D_N$ and the point F are found by geometry (i.e., triangulation) since the location of point F and the locations of the receivers $4D_1 \ldots 4D_N$ are known a priori. The distances designated $1_1 \ldots 1_N$ in FIG. 4 are divided by the wavelength of the sound used. The resultant value will have an integer component and a fractional component: the integer component represents the number of whole wavelengths between a receiver $4D_i$ and the focus point F, the fractional component is the fractional part of a wavelength which remains. In FIG. 4, $M\lambda$ represents the integer component of the distance in $1_n$; $(1_n - M\lambda)$ represents the fractional component, where $\lambda$ is the wavelength of the sound used. The fractional component can be written:

$$\phi_i = FR \, (l_i/\lambda)$$

where FR indicates a fractional operator. The phase shift $\phi_1 \ldots \phi_N$ which each receiver signal must be shifted can thus be found simply from the array geometry and the position of the focal point F. To accomplish focusing requires that each signal be shifted in phase and then summed to effect the "constructive interference" discussed earlier.

$$A_{tot} \sin(\omega t + \phi_{tot}) = \sum_{i=1}^{n} W_i A_i \sin(\omega t + \phi_i \, \theta_i)$$

$A_1$ is the amplitude of the signal from the receiver $4D_i$ where $W_i$ is the "array weighting" (discussed later)
$A_i \sin(\omega t + \theta_i + \phi_i)$ and $A_2 \sin(\omega t + \theta_2 + \phi_2)$
$\phi_i$ is the "focus phase shift" as just described
$\omega$ is the frequency of the wave energy
t is the time
$\theta_i$ is the phase of the signal from receiver $4D_i$
$\phi_{tot}$ is the combined phase signal
$A_{tot}$ is the combined amplitude signal In practice the calculation above can be determined quickly using real and imaginary components of these signals. Each signal, represented by amplitude $A_i$ and phase $\theta_i$ values determined by the computer 8 in FIG. 2 after processing the sampled data string from the ADC 26, can be thought of as a vector having a length $A_i$ and an angle from the origin of $\theta_i$ as shown in FIG. 5A. When phase shifted by $\phi_i$, a new vector of the same length $A_i$—but of phase $(\theta_i + \phi_i)$—is formed. FIG. 5B, which again shows the "phasor" representation of the signals, indicates how two of these vectors $A_i \sin(\omega t + \theta_i + \phi_i)$ and $A_2 \sin(\omega t + \theta_2 +$ can be added vectorially to give a resultant vector. As suggested above, the cartesian coordinates of the vectors can be combined more easily than their corresponding polar coordinate vectors.

Figure 6:
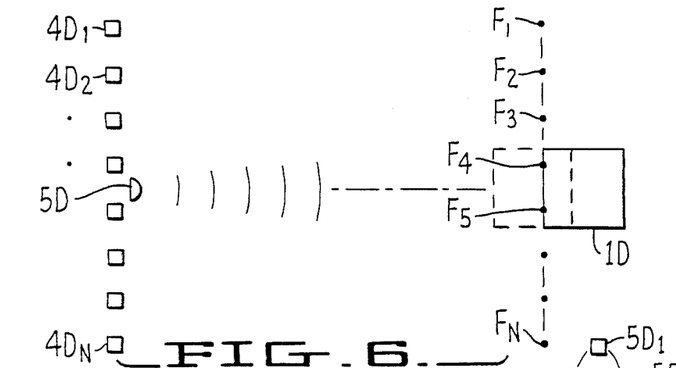
FIGS. 6 and 7 show diagrammatically forms the transmitter and receivers of FIG. 2 can take.

The combined signal $A_{tot} \sin(\omega t + \phi_{tot})$ represents the acoustic signal emanating from point F. A large signal is represented by a large vector (denoted by $A_{tot}$ and $\phi_{tot}$), a small signal by a small amplitude. In order to accomplish scanning, the calculation must be performed for many different points, $F_1 \ldots F_N$ at various locations. If the point $F_i$ (one of the scanned points $F_1 \ldots F_N$) corresponds to a point on the object, larger amplitudes will result in the calculation $A_{tot}$ and $\phi_{tot}$. For example, in FIG. 6 focus points $F_4$ and $F_5$ coincide with the presence of the 1D and larger combined vector (denoted by $A_{tot}$ and $\phi_{tot}$); other points (e.g., $F_1$ and $F_2$) have a smaller combined vector. Thus the location of an unknown object 1D is found by repeated application of the method just described.

Figure 7:
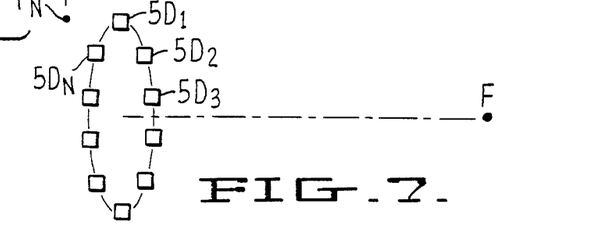

Some attention should be given here to the transmitter 5D. While in some applications the transmitter 5D might be an omni-directional one in which wave energy is transmitted in all directions, better scanning of objects like the object 1D occurs when a directional transmitter $5D_1 \ldots 5D_N$ is used (see FIG. 7). Directional transmitters may themselves be of the phased-array variety as discussed by Pelham "Phase Monitoring Using Phased Array Transducers". A. Pelham, B.S. Thesis, E. E. Dept., M.I.T., May 1979, where signals sent to an array of transmitters $5D_1 \ldots 5D_N$ are shifted in phase such that their wave energy combines at a particular point F. If the transmitter array is electronically steerable, as Pelham's was, the wave energy can be directed to the same point on which the receiver array is focusing. Hence the ability to scan an object is enhanced both by focusing the wave energy at a point and, in turn, receiving only the wave energy emanating from the point, as herein discussed.

In other applications, electronically steering the transmitter array is not required. For example, in robotics, the transmitters and receiver array may be embedded in the gripper or hand of the robot as shown in FIG. 2. In this case, the "steering" may be accomplished by pointing the transmitting array at various focus points, i.e., physically moving the transmitter array. In instances where the array can be moved, several methods are available for directing wave energy.

Figures 8A, 8B, 10:
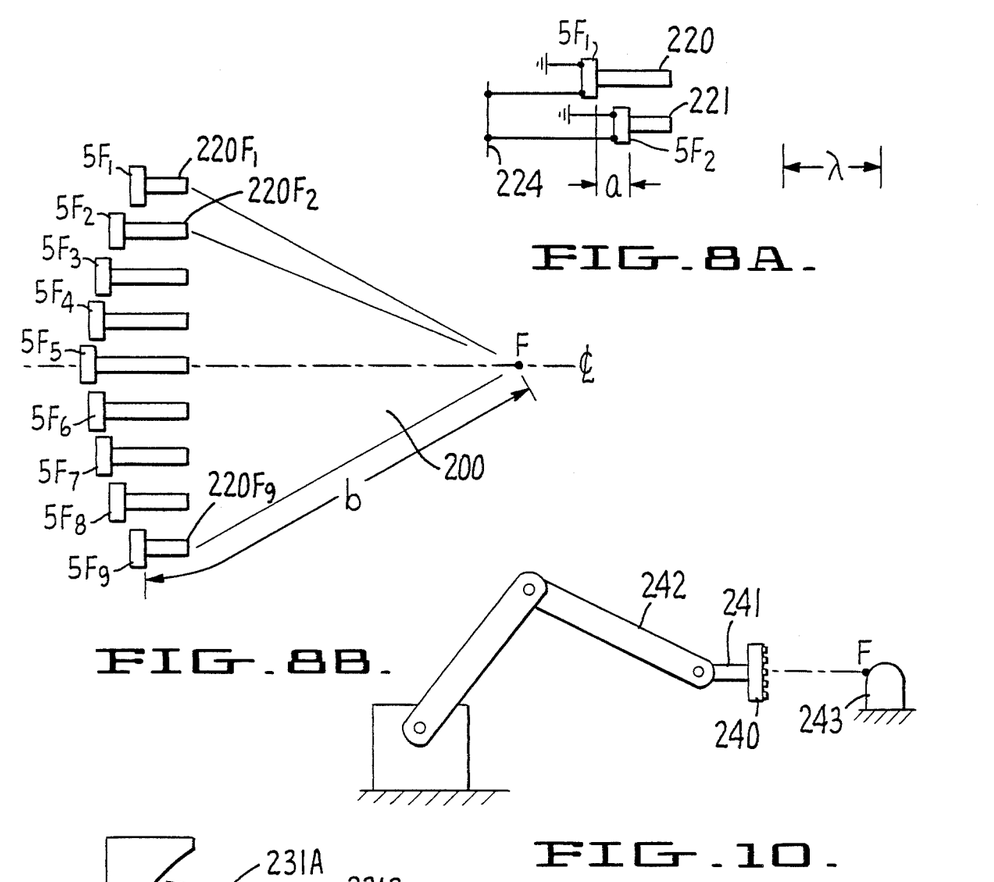
FIG. 8A shows a scheme for phasing a transmitter consisting of a plurality of transducers which may act to transmit and receive acoustic energy.
FIG. 8B shows a transducer array employing the transducers of FIG. 8A.
FIG. 10 shows diagrammatically a robot employing sensing arrays according to the present teachings.

The phase shift between transmitters in a phased array need not be changed electronically; rather they may be constant or fixed phase shift. These constant phase shifts may be induced either electronically or acoustically. Electronically, the phase to a particular transmitter is delayed, for example, by the method which Pelham used. Acoustically the transmitter phases may be shifted through the use of wave guides as shown in FIG. 8A. Here only two transmitters $5F_1$ and $5F_2$ are shown with waveguides 220 and 221, respectively. The waveguides are small tubes whose diameter is much less than the wavelength of the sound being transmitted. Under these conditions, the tube ducts the sound along its length.

Returning to FIG. 8A, it will be noted that the waveguides 220 and 221 are of differing lengths. Assuming that both transmitters $5F_1$ and $5F_2$ are fed the same electrical signal via connection 224, then the acoustic energy arriving at the end of waveguide 220 will be delayed in time from that arriving at the end of waveguide 221. The acoustic energy arrives later because it must travel a greater distance along its respective waveguide; the phase shift between two transmitted acoustic signal $5F_1$ and $5F_2$ is given by $$\phi = 2\pi FR - \left(\frac{a}{\lambda}\right)$$

where
  a = the length difference between the waveguide 220 and 221
  $\lambda$ = the wavelength of sound transmitted Such acoustic or electronic methods of phase shifting can allow a transmitter array to focus its acoustic energy at some fixed point relative to the array. The point at which the energy focuses is determined in much the same way as it was for phased arrays in the receiving mode: constructive interference of the energy from the array of transmitters. FIG. 8B shows a transmitting array of transmitters $5F_1 \ldots 5F_9$ designed to focus their acoustical energy to point F along the center line of the array. The distance marked b from the focal point F to the transmitter end of any waveguide $220F_i$ and through the waveguide $220F_i$ to its associated transmitter $5F_i$ has been made the same for all transmitters $5F_i$ from $5F_1$ to $5F_9$. Electrical signals fed to the transmitters $5F_1 \ldots 5F_9$ are identical. Thus the acoustic energy produced at the transmitters $5F_1 \ldots 5F_9$ is in phase. As it travels down the waveguides $220F_1 \ldots 220F_9$ and out into the medium, the acoustic energy at the focal point F will be in phase as well, producing constructive interference at point F and concentrating acoustic energy at that point. If an object were at point F, then much more acoustic energy would be reflected from the object than if a single sound transmitter were used. It will be noted that other arrangements of transmitters $5F_1 \ldots 5F_N$ can give sound focusing in a particular direction, in particular areas, along particular lines, or (in 3-dimensional applications) in particular regions.

Figures 9, 11:
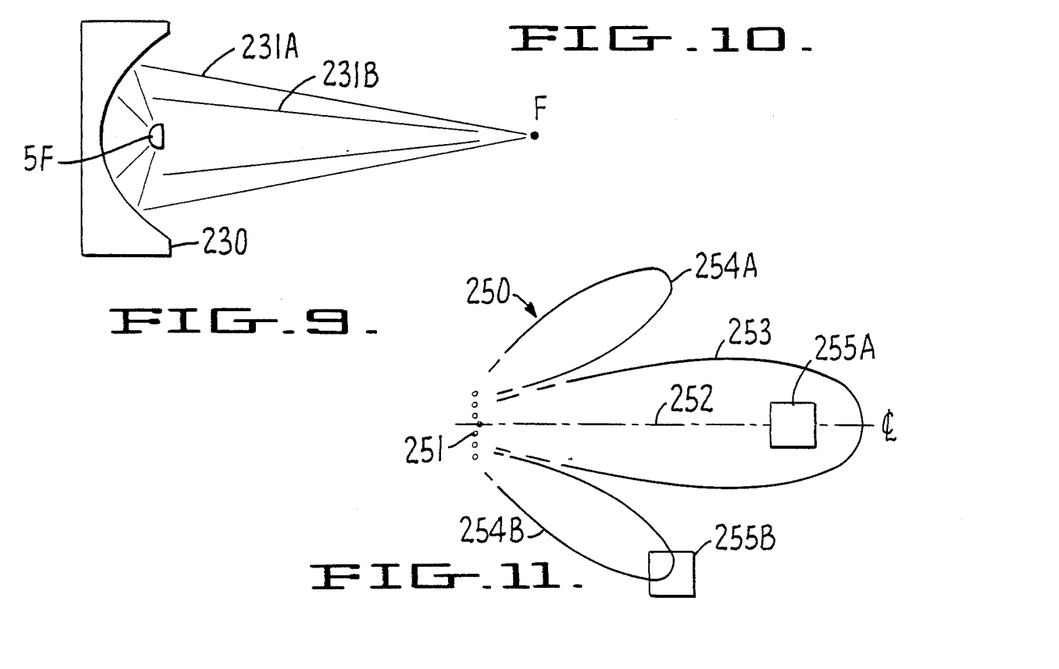
FIG. 9 is a side diagrammatic, partially sectioned, representation of a transmitter and/or receiver of acoustic wave energy, employing a reflector to focus outgoing and/or incoming wave energy.
FIG. 11 shows schematically acoustic wave patterns which may be used to render arrays directionally sensitive.

Another method of focusing acoustic energy is the use of reflectors. FIG. 9 shows a two-dimensional reflector 230 which reflects acoustic energy from a transmitter 5F to a particular point. The transmitter 5F is often an omni-directional one which transmits equal acoustic energy to nearly all directions. The shape of the reflector 230, is such as to reflect acoustic energy while maintaining the same phase relationship between rays 231A or 231B which emanate from the transmitter 5F and converge, for example, at focal pint F, after reflecting from the reflector 230. In the example shown in FIG. 9, acoustic energy is transmitted primarily away from the focal point F and toward the reflector 230; the array is omni-directional only in directions toward the reflector. Other configurations of reflectors give focusing in particular directions, in particular regions or along particular lines.

These methods of focusing acoustic energy can be used to advantage in either moving or stationary applications. FIG. 10 shows a moving application where the transmitting array 240 is embedded in an end effector 241 or gripper of a robot 242. The array in this example is focused at point F. When an object 243 is at the focal point, the reflected acoustic energy from the object is much greater than if the acoustic transmitter was not an array. When the robot 242 moves its end effector 241 to various points, it can "scan" the object 243. When the focal point F coincides with the object's surface, the enhanced output of receivers located in the end effector 241 or elsewhere will indicate the shape of object 243. In addition, the previously described techniques for imaging receiver outputs can be used in conjunction with focused transmitter arrays.

Previously, in relation to receiver phasing, a weighting factor $W_i$ was introduced. This weighting factor is useful for both receiver and transmitter phasing as will now be discussed. The weighting techniques were developed for phased array radar and are thoroughly documented for that application in "Antennae Engineering," by W. L. Weeks, (McGraw-Hill, 1968).

The weighting factors in receivers are easily implemented. As shown earlier they are constant coefficients which are multiplied by the phase shifted phasor signals received at each microphone. The function of the weights is to "tune" the receiver array for specific directions. Without the weights, a receiver array is sensitive to signals from a particular direction. It is also somewhat sensitive to signals from other directions. FIG. 11 shows a sensitivity diagram 250 for a particular receiver array 251; it is an array with a nominal direction along its centerline. A central lobe 253 is accompanied by two side lobes 254A and 254B. Thus the array 251 is sensitive to objects, such as an object 255A, which are on or near its centerline 252, but it is also sensitive to objects, such as an object 255B, wich are in the direction of a side lobe 254B.

Figure 12:
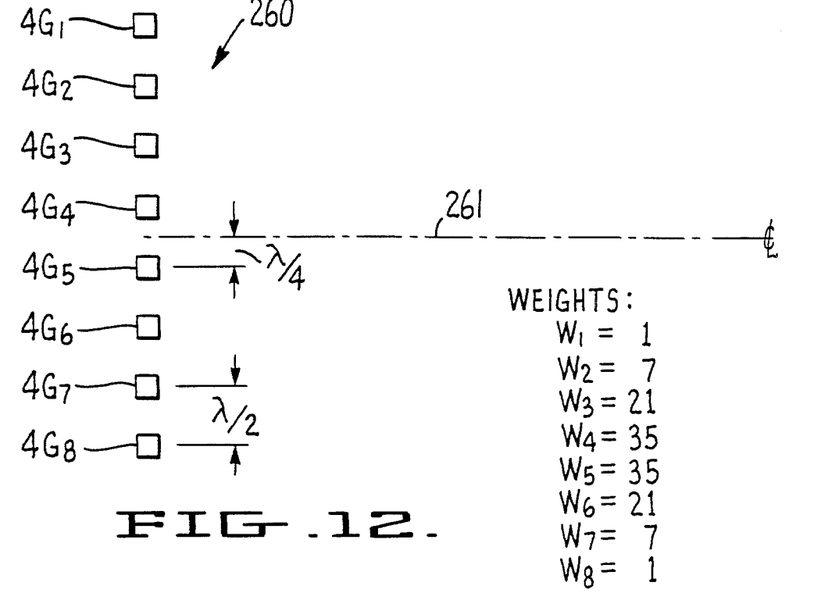
FIG. 12 shows diagrammatically an array to apply weighting factors to the acoustic energy.

By changing the weights $W_i$, the side lobes such as 254A and 254B can be reduced in sensitivity by comparison to the central lobe 253. In general, there are more than two side lobes and a proper choice of weights can reduce the effects of all side lobes while maintaining most of the sensitivity of the central lobe. In radar phased arrays, such a weighting has been optimized. For example, a "binomial" weighting of elements in the array produces a strong central lobe while diminishing side lobes for objects far from the array. A binomial weighting is one in which the central receivers in the array are weighted more than those at the periphery of the array. For example, in the eight element array 260 shown in FIG. 12, whose receivers $4G_1 \ldots 4G_8$ are spaced uniformly at half wavelength intervals perpendicular from the array's centerline 261, the binomial weights $W_1 \ldots W_8$ shown in FIG. 12 are appropriate.

Figure 13A:
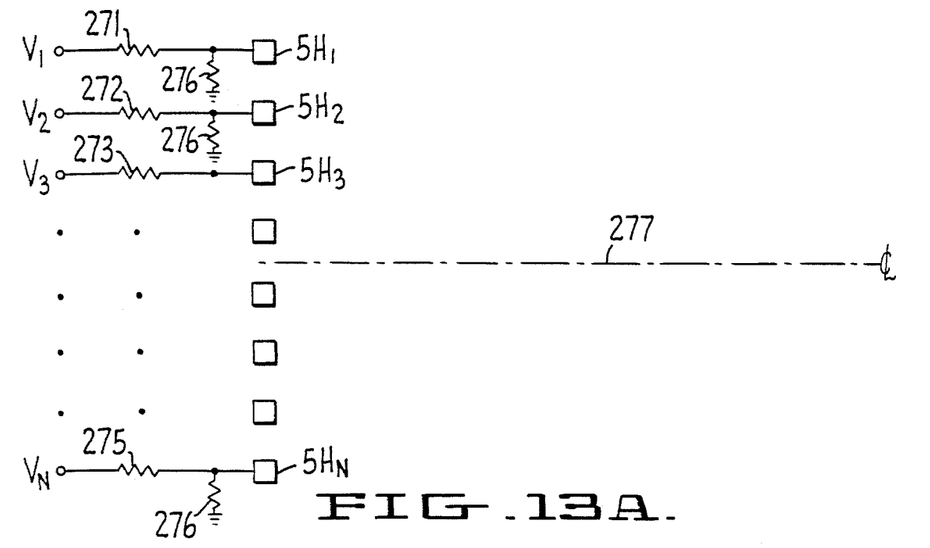
FIGS. 13A and 13B show two alternative ways to apply weighting to acoustic energy.

Weights are used on transmitter arrays as well as on receiver arrays. Since the transmitters actually produce acoustic energy, their weights must affect the transmitted acoustical signals produced by each transmitter (whereas in receiver arrays the weights are usually incorporated into the data analysis performed on the received signals). For example, FIG. 13A shows how the acoustical energy transmitted from an array $5H_1 \ldots 5H_N$ is "weighted" by the resistor networks labeled 271 ... 276. Given a voltage signal $V_1 \ldots V_N$ transmitted to transmitters $5H_1 \ldots 5H_N$, respectively, the resistors 271 ... 275, for example, attenuate the signals $V_1 \ldots V_N$ being fed to the transmitters by bleeding current through pull-down resistors 276. For weighting similar to that of the receiver array in FIG. 12, the resistors 271 ... 273 have progressively lower values of resistance, thus giving the transmitters furthest from the centerline labeled 277 the least weighting while giving those nearer the centerline 27 more weighting.

Figure 13B:
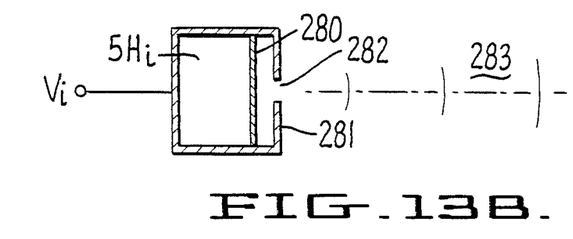

An alternative method of weighting the transmitted acoustical energy of a transmitter $5H_1 \ldots 5H_N$ is to attenuate the acoustical signal itself after the transmitter has produced the acoustic signal from the electrical signal $V_1 \ldots V_N$ FIG. 13B shows a transmitter $5H_i$ with a vibrating diaphragm 280 whose motion is caused by an electrical signal $V_i$. The diaphragm is covered by a mask 281 with a small orifice 282 sized to allow only a portion of the acoustic energy produced by the diaphragm 280 to be transmitted into the medium 283 in the region around the transmitter $5H_i$. As before, an array would typically have higher weights (larger orifices 282) near its centerline than at its periphery. Other mechanisms for acoustical weighting include acoustic resistors which attenuate acoustic energy through them (such as open-cell foam), as well as acoustic circuits such as Helmholtz resonators or tank-orifice combinations which attenuate acoustic signals as a function of the transmitted frequency. It will be noted that such acoustic weighting methods are also applicable to receiver arrays such as the array $4G_1 \ldots 4G_8$ in FIG. 12.

For specific applications of the acoustic measuring technique just described, proper placement of the receiver and transmitter can inherently improve the accuracy of measurements. The transducer configurations described now are special purpose phased arrays appropriate for special tasks.

Figure 14:
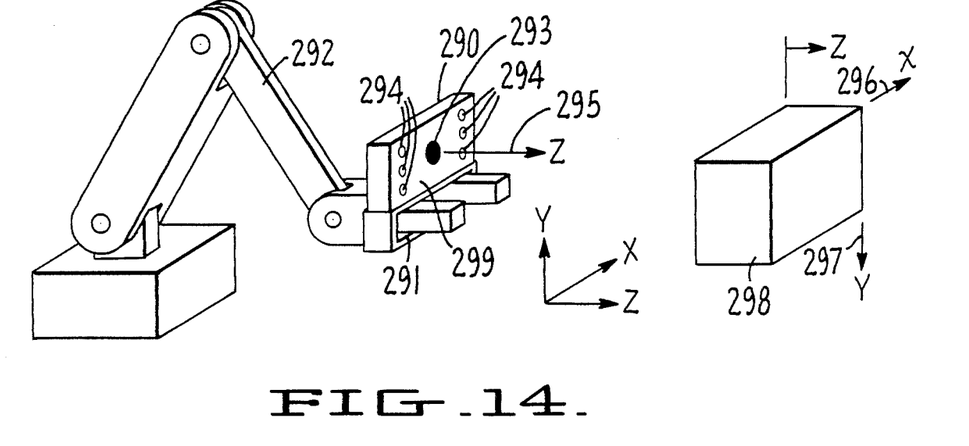
FIG. 14 shows diagrammatically a way to render an array range sensitive.

In FIG. 14, a "range-sensitive" array 290 is shown. Such an array 290 is shown attached to the gripper 291 of a robot 292, a typical application. A transmitter 293 is a directional one (note that directional effects also occur in diaphragm transmitters whose wavelength of transmission is the proper ratio to the diaphragm diameter) which transmits its acoustical wave energy primarily in the Z direction labeled 295, i.e., perpendicular to the plane of the array 290. Acoustic receivers 294 detect acoustic wave energy reflected primarily from an object 298 in the Z direction 295.

Such an arrangment tends to be most sensitive to the Z (or range) direction (or dimension) of an object 298 but less sensitive to the X direction (or dimension) 296 or Y-direction 297. "Sensitive", in this respect, means the change of wave characteristics such as $\theta_i$ of each receiver 294 to a specific dimension change 295 ... 297 (where a dimension change implies, also, either a shape change or a position change). For example, in the "range-sensitive" array 290 shown, actual measurements show that the phase measurements from a small position change of the object 298 in the range (or Z) direction 295 are five times as sensitive to the same position change of the object 298 in the X direction 296 or Y direction 297. Acoustic damping material 299 reduces the sensitivity of the measurements to standing waves between the array 290 and the object 298, if required.

Figure 15A:
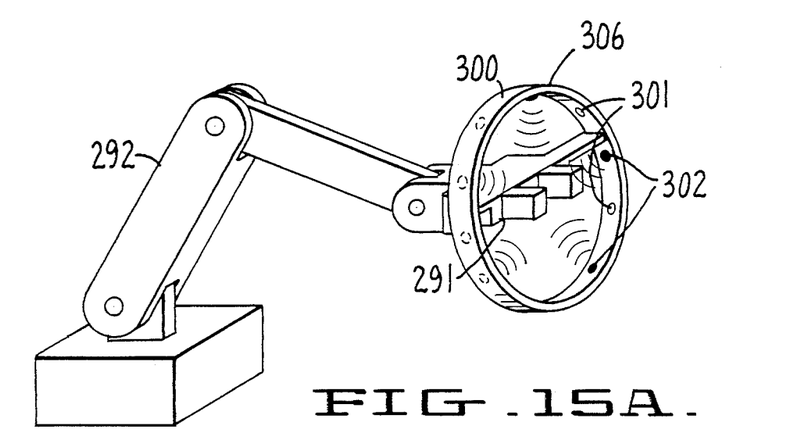
FIGS. 15A, 15B and 16 show schemes to render arrays directionally and/or range sensitive.

FIG. 15A shows a "radial-sensitive" array 300 whose transmitters 302 and receivers 301 are attached to the inside of a ring 306. Acoustic energy from the transmitters 302 is directed radially inward toward an object 305 as in detail in FIG. 15B. Such an array 300 is most sensitive to the radial dimension change 304, i.e., either the radial position of an object 305 or the radial size of the object 305. It is less sensitive to position or shape change in the range (or Z) direction marked 303.

Figure 15B:
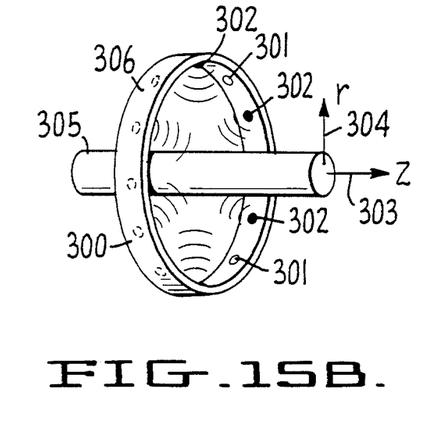

An array such as array 290 in FIG. 14 would be appropriate for applications where the proper range or distance from an object is accurately required such as in welding or object-grasping. An array such as array 300 in FIGS. 15A and 15B is appropriate when sensitivity to radial changes are required, for example, when inserting a gripper-held bearing onto a shaft such as the cylindrical-shaped object 305

Figure 16:
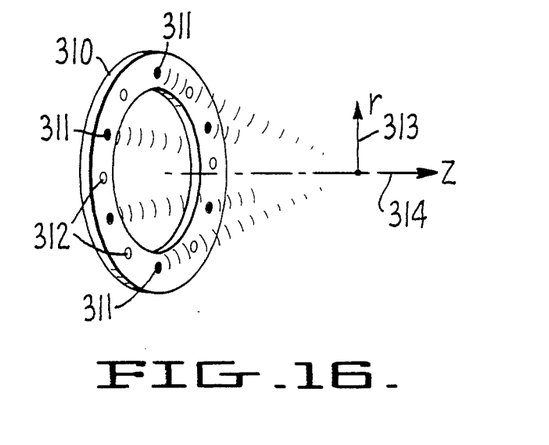

Other arrays can be made variously sensitive to other directions as well or to combination of directions. For example, the array shown at 310 in FIG. 16 combines the radial sensitivity of the array 300 in FIGS. 15A and 15B with the range (or axial) sensitivity of the array in FIG. 14. Transmitters 311 are omni-directional but their acoustic wave energies combine constructively along the array's centerline of Z direction marked 314: a radial phased array. Thus it is sensitive to the radial direction 313 as the array 300 is. But the array 310 is also sensitive to the range direction 313, just as the array 290 is sensitive to the range direction.

The "phased array" approach, with its multitude of variations just discussed, is but one approach to deducing shape or position information of objects in an unstructured environment (or for improving the sensitivity to objects in a structured environment). The technique called differential phase measurement uses proper placement of transducers combined with data manipulation (in either hardware or software) to improve the capabilities of the shape and position measurements discussed in the Buckley U.S. patents referred to previously.

Figures 17A, 17B, 18A:
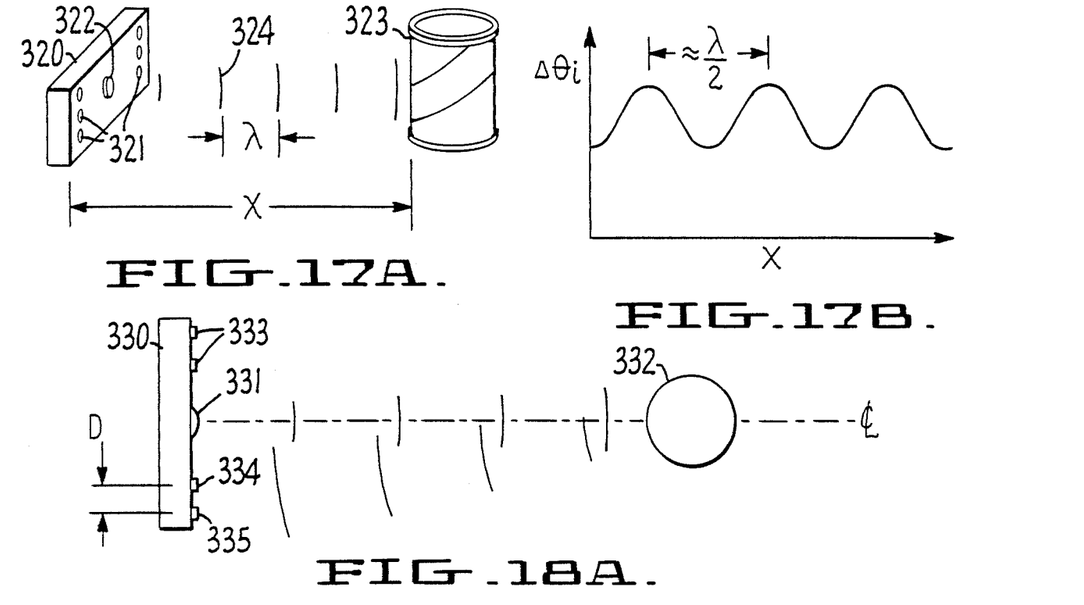
FIG. 17A shows a directionally-sensitive array and FIG. 17B is a graphical representation of phase shift.
FIGS. 18A, 18B and 19 show diagrammatically further arrays.

The difficulty with the previous invention, as discussed earlier, is the sensitivity of the measurements under certain conditions. For example, in FIG. 17A a directional transmitter 322 in an array 320, which might be attached to a robot gripper (not shown for clarity), sends acoustic wave energy 324 toward an object 323. The directional transmitter 322 may be a multi-emitter such as the transmitter 311 in FIG. 16 or other directional transmitter. The acoustic energy reflected from the object 323 is detected by receivers 321. In addition, the receivers 321 receive acoustic energy directly from the transmitter 322. FIG. 17B shows a typical phase shift signal $\Delta\theta_i$ from a receiver 321 as the distance X between the object 323 and the array 320 varies, as reported by Stelson ("Phase Monitored Inspection Theory and Application", K. Stelson, M.S. Thesis, ME Dept., M.I.T., June 1977).

The phase signal $\Delta\theta_i$ varies in a sawtooth fashion, repeating approximating every half wavelength of the emitted acoustic energy. While linearity assumptions, such as those used in the matrix technique disclosed in the Buckley U.S. Pat. Nos. 4,095,474 and 4,200,921, can determine the change in distance X between the array 320 and the object 323, they cannot determine the distance X itself because the curve is only linear over short distances. Thus the phase measurements $\Delta\theta_i$ are too sensitive to changes in the distance X.

FIG. 18A shows a modified transducer array 330 as seen from above. The array 330 is similar to the array 320 with a directional transmitter 331 directing acoustic energy at an object 332 whose reflected wave energy is received by receivers 333 . . . 335. The receivers are arranged in pairs such as the receivers 333 or 334 . . . 335; the distance between two receivers of a pair is D which is chosen to be typically less than half a wavelength of the transmitted wave energy.

Figures 18B, 19, 20:
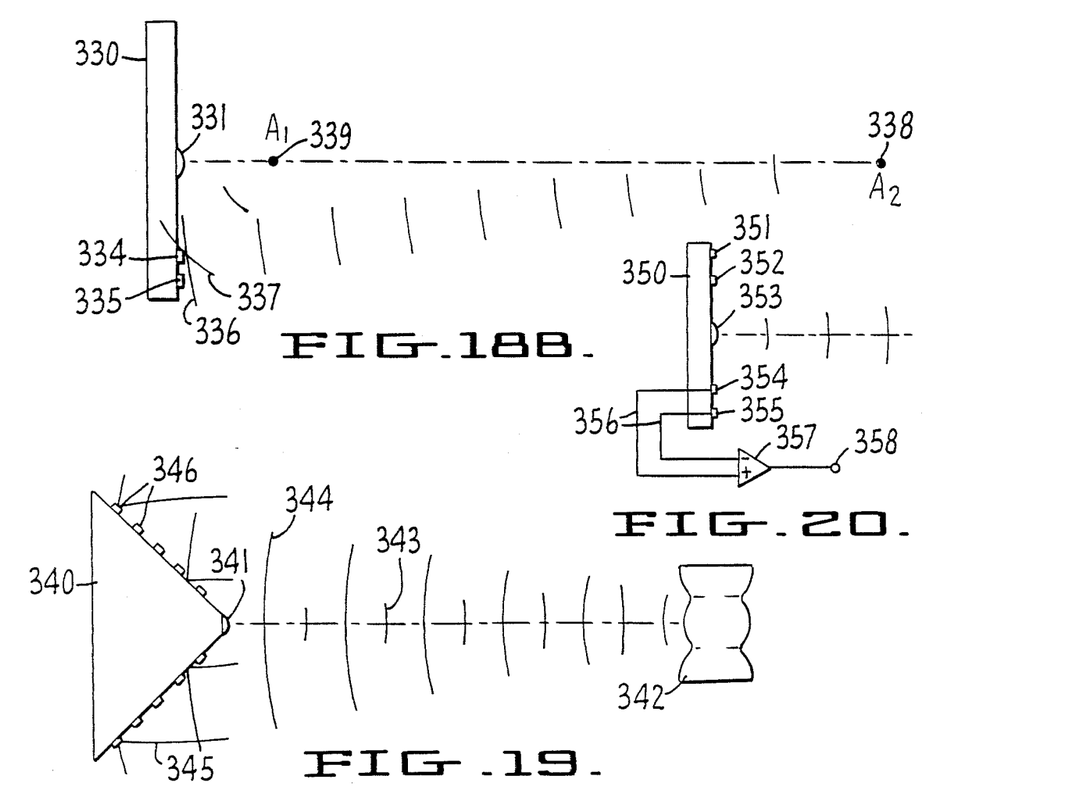
FIG. 20 shows diagrammatically an array whose outputs are fed to an electrical summer.

As a first approximation, reflected wave energy from the object 332 can be thought of as a point source of sound emanating from a point within the confines of the object 332. FIG. 18B shows how waves 336 from a sound source 338 (representing reflected wave energy from an object such as 332, FIG. 18A) arrive at the receivers 334 and 335. The waves 336 arrive at both receivers 334 and 335 nearly in unison; hence the phase differential between the two receivers is very small.

However, if the object moves toward the array 330 (represented by the sound source 339 along the array's centerline), the waves 337 arrive at receiver 334 somewhat before they arrive at receiver 335: a large phase differential exists when the sound source is close to the array 330.

Thus, if the difference in phase signals between two receivers 334 and 335 in close proximity is measured, the resultant phase differential varies slowly with the distance X between the array 330 and the object 332 in FIG. 18A. Had the spacing D between the pair been a half wavelength, then the phase differential between the microphones 334 and 335 would vary from zero when D is very large to $\pi$ radians when D is nearly zero. Since the object 332 is only approximated by the sound source 338 or 339, the ideal phase differentials expected are seldom found in practice. However, phase differentials are generally more smoothly varying than the phases themselves.

Standing waves are a detriment to the smoothly varying functions produced by phase differentials. Standing waves occur when multiple reflections occur, say, between an object such as object 298 in FIG. 14 and the array 290. Acoustic damping or absorbing material 299 between the various transducers of the array reduces the standing waves.

FIG. 19 shows another way in which standing waves may be reduced or eliminated. An array 340 is wedge-shaped having a transmitter 341 which sends acoustic wave energy 343 toward an object 342. Reflected wave energy 344 from the object 342 is reflected at 345 by the sides of the wedge array 340 away from the object 342. Hence the wave energy 345 does not return to the object 342 to produce regions of constructive and destructive interference in the region between the array 340 and the object 342.

Phase differentials may be formed in several ways. One-way is the analysis method described earlier: The phases recorded on two receivers may be simply substracted during the processing of the data (it will be again noted that the use of the term "phases" here is used for simplicity, that "phase differentials" implies differences of wave characteristics between two receivers and can be phases themselves, amplitudes or combinations or phases and amplitudes). The phase differentials may also be formed electronically in hardware. FIG. 20 shows a transducer array 350 with an acoustic transmitter 353 which sends acoustic wave energy to an object whose reflected wave energy is received by receivers such as receiver-pairs 351-352 . . . 354-355. Phase differentials from the receiver-pair 354-355 are formed by feeding their electrical signals via connections 356 into a differential amplifier 357. The differential amplifier electronically substracts the two electrical signals giving an output 358 which is the phase differential between receivers 354 and 355.

In general, several microphone signals can be combined together electrically rather than simply two as shown in FIG. 20. For multiple receiver combinations, several receivers such as the receivers 354 and 355 are connected to a summing junction by connectors such as connectors 356. A summing junction acts in a similar manner to the differential amplifier 357, except it can accept multiple inputs rather than just two. In this application, the summing junction can sum the receiver signals, subtract the receiver signals or sum a portion of the receiver signals and subtract the rest: the sign of the signal is altered as needed.

Figure 21:
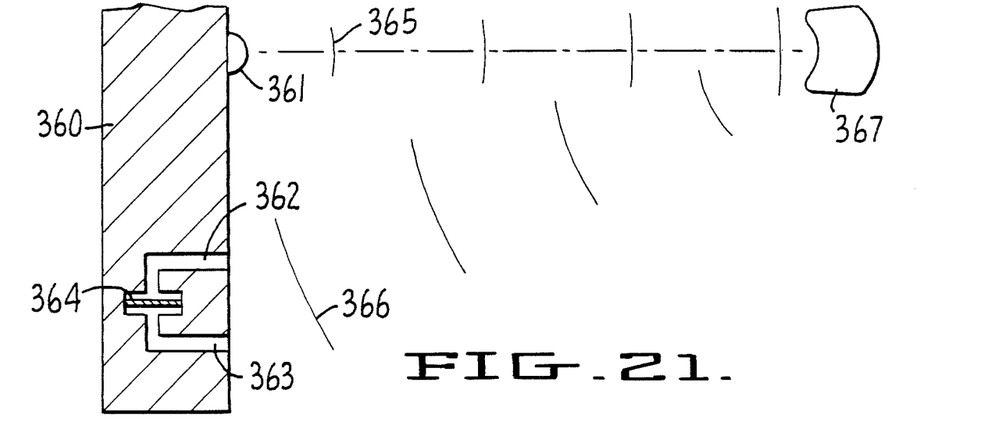
FIGS. 21 and 22 show sectional views of an array which mechanically sum acoustic wave inputs.

Phase differentials may be formed acoustically as well. FIG. 21 shows an array 360 with a directional transmitter 361 transmitting acoustic wave energy 365 which is reflected from an object 367 to arrive at the receivers as wave energy 366. In this case, two waveguides 362 and 363 transmit the wave energy 366 from two separate locations to a differential acoustic receiver 364. Typically a differential receiver has a diaphragm on each side of which acoustic energy may impinge. The differential receiver itself acts to produce a phase differential.

Figure 22:
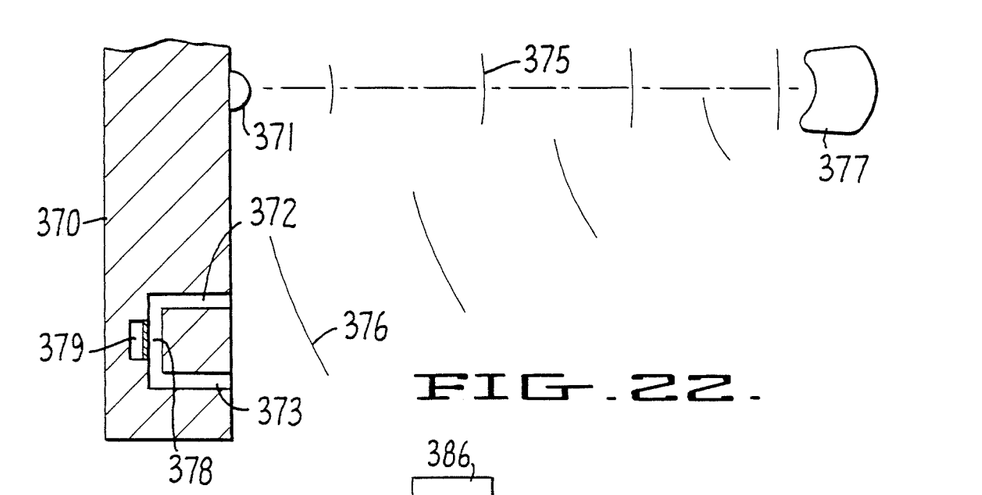

Yet another method by which phase differentials may be measured, acoustically is shown in FIG. 22. An array 370 has a transmitter 371 which generates acoustic wave energy 375 which is reflected back from object 377 toward the array 370. The reflected wave energy 376 is received by waveguides such as 372 and 373 which duct the wave energy to a plenum or chamber 378. The pressure in the chamber 378 is a vector summation of the wave energy entering it when the waveguides 372 and 373 and chamber 378 are small compared to the wavelength of the emitted wave energy. A receiver 379 detects the pressure in the chamber 378. The receiver signal varies in phase depending on the direction from which the reflected wave energy 376 is reflected, i.e., the direction of the object 377. More than two waveguides may be combined in chamber 378 to give a weighted, phased-array effect, as discussed previously.

In practice, the techniques discussed can glean information about objects in their vicinity. However, certain other apparatus and methods can improve the general resolution of the acoustic measurements made: improved temperature control of the medium, moving the medium and temperature control of the transducers.

Figure 23:
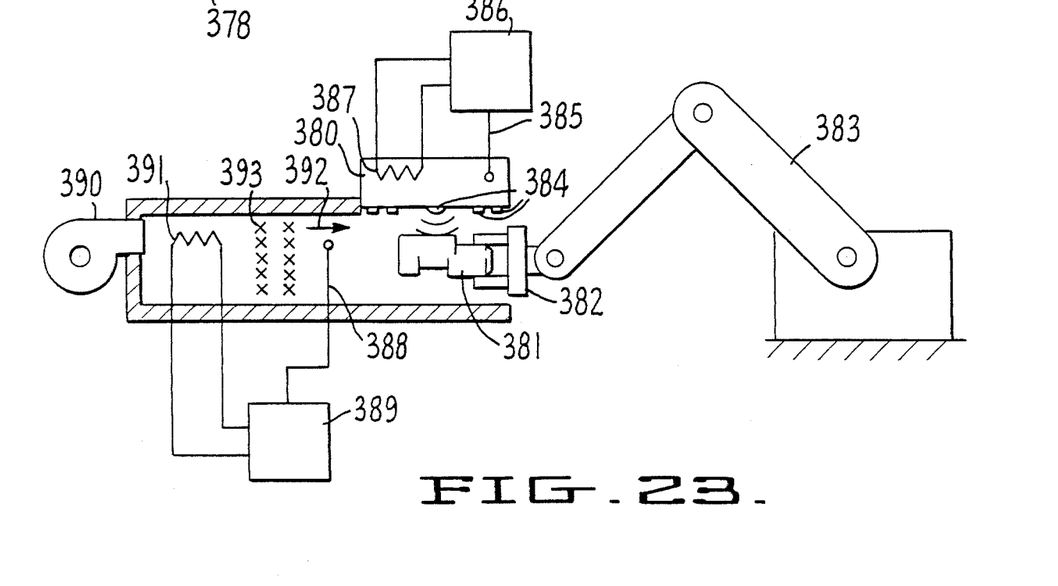
FIG. 23 is a diagrammatic side view, partially sectioned, of a robot and related apparatus to perform in a useful system many of the operations according to the disclosed systems.

FIG. 23 shows a typical application where all three of the techniques of the present invention are used. A robot 383 holds an object 381 in the vicinity of a transducer array 380. The array is, as described previously, with transmitting and receiving transducers 384 which determines the shape, the position or the orientation of the object 381. The medium 392 through which the acoustic wave energy travels is both moving and temperature-controlled.

The moving medium 392 is propelled by a fan 390 which forces the medium past the object 381. In practice, simply maintaining a gentle flow of the medium 392 can improve longterm phase resolution by a factor of five or more. The present inventors believe that moving the medium 392 ensures that the average temperature of the medium varies less quickly than if the medium is still. Since the acoustic measurements are strongly influenced by the medium's temperature, temperature stability gives better phase measurement resolution.

In addition to simply moving medium, even better long-term phase measurements result if the medium's temperature is held fixed. In FIG. 23, a heating element 391 heats the medium 392 before flowing past the object 381. A temperature sensor 388 detects the medium's temperature and controls the energy to the heating element 392 via the controller 389. Mixers 393 ensure that the medium 392 is thermally mixed before flowing past the object 381. By controlling the temperature of the medium 392, temperature compensation for the wavelength of the acoustic wave energy (as discussed in U.S. Pat. No. 4,287,769) is not required. It will be noted that it is the temperature of the medium which is being controlled, not the temperature of the object.

Another way of improving phase measurement resolution is by holding fixed the temperature of the array 380 along with its transducers 384. The transducers 384 are mounted on a heat-conducting block, such as aluminum, with good thermal contact between the transducers and the block. A temperature sensor 385 senses the temperature of the block and controls the heat to a heating element 387 via a temperature controller 386. The transducers 384 are held at a temperature higher than would be encountered in the field so that heat must always be added to the array 380 to hold its temperature fixed. By keeping the transducers 384 at a fixed temperature, drift and phase shifts associated with a typical transducer can be all but eliminated. Since the transducers in an array 380 seldom have the same phase shift with temperature, holding the array at a fixed temperature eliminates the cost of matched transducers 384.

Further modifications of the invention will occur to persons skilled in the art and all such modifications are deemed to be within the scope of the invention as defined by the appended claims.

What is claimed is:

1. An acoustic sensing system that comprises:
   means for transmitting in a gas medium continuous acoustic wave energy at a single frequency which interacts with an object in a sensing region, which acoustic wave energy is reflected by the object;
   means for detecting the reflected acoustic wave energy with a multiplicity of acoustic receivers that are operable to provide electrical signals representative of the reflected acoustic wave energy;
   means for processing the electrical signals from said multiplicity of acoustic receivers to obtain at least one of amplitude information and phase information for each of said multiplicity of acoustic receivers; and
   means for combining said at least one of amplitude information and said phase information from each of said multiplicity of receivers to obtain a single combined signal that represents a geometric parameter that includes at least one of shape, position and orientation information of said object;
   the means for transmitting being adapted to focus the acoustic wave energy with respect to predominantly one portion of the object to give a strong acoustic reflected signal from said one portion, said single combined signal being a measure of the acoustic wave energy emanating from said one portion.

2. A sensing system as in claim 1 in which the means for processing electrical signals is operable to process the electrical signals from said multiplicity of acoustic receivers serially, that is, one after the other, and which includes filtering means to exclude signals at frequencies other than said single frequency, said means for combining being operable to provide said single combined signal in the form $A_{tot} \sin(\omega t + \phi_{tot})$, where $$A_{tot} \sin(\omega t + \phi_{tot}) = \sum_{i=1}^{n} W_i A_i \sin(\omega t + \phi_i + \theta_i).$$

$W_i$ is a weighting factor,
$A_i$ is the amplitude of the acoustic wave energy received by each receiver of the multiplicity of receivers, $\phi_i$ is a focus phase shift in the acoustic wave energy,
$\omega$ is the frequency of the acoustic wave energy,
t is time,
$\theta_i$ is the phase of the acoustic wave energy received by each receiver of the multiplicity of receivers,
$\phi_{tot}$ is the combined phase signal, and
$A_{tot}$ is the combined amplitude signal.

3. A sensing system as in claim 1 in which the means for processing the electrical signals is operable to process the electrical signals from said multiplicity of acoustic receivers in parallel, that is, with multiple processing circuits which can simultaneously obtain said amplitude information and phase information from at least two of said multiplicity of acoustic receivers, said means for combining being operable to provide said single combined signal in the form $A_{tot} \sin(\omega t + \phi_{tot})$, where $$A_{tot} \sin(\omega t + \phi_{tot}) = \sum_{i=1}^{n} W_i A_i \sin(\omega t + \phi_i + \theta_i),$$

$W_i$ is a weighting factor,
$A_i$ is the amplitude of the acoustic waver energy received by each receiver of the multiplicity of receivers,
$\phi_i$ is a focus phase shift in the acoustic wave energy,
$\omega$ is the frequency of the acoustic wave energy,
t is time,
$\theta_i$ is the phase of the acoustic wave energy received by each receiver of the multiplicity of receivers,
$\phi_{tot}$ is the combined phase signal, and
$A_{tot}$ is the combined amplitude signal.

4. A sensing system as in claim 1 which includes directional sound transduction means to direct said acoustic wave energy to and from the predominantly one portion of said sensing region to enhance the level of said electrical signals.

5. A sensing system as in claim 4 which include reflector means for said directional sound transduction means.

6. A sensing system as in claim 4 which includes means for changing said portion of said sensing region with respect to which the acoustic wave energy is focused to derive information with respect to many portions of the object.

7. A sensing system as in claim 4 which includes multiple acoustic transducer means for said directional sound transduction means.

8. A sensing system as in claim 7 which includes acoustic delays to accomplish said directional sound transduction means.

9. A sensing system as in claim 7 which includes electrical signal delay to accomplish said directional sound transduction means.

10. A sensing system as in claim 7 which includes a weighting means for reducing the effect of said directional sound transduction means in portions of said sensing region other than said predominantly one portion of said sensing region.

11. A sensing system as in claim 4 wherein said means for processing electrical signals from said multiplicity of receivers accomplishes said directional sound transduction.

12. A sensing system as in claim 2 wherein said acoustic transmitting means and said multiplicity of acoustic receivers are so arranged to make said amplitude information and said phase information sensitive to a particular variation of said shape, position or orientation information of said object.

13. A sensing system as in claim 1 wherein said processing means includes means to obtain combinations of amplitude information and phase information from several of said multiplicity of acoustic receivers.

14. A sensing system as in claim 13 wherein said means to obtain combinations of amplitude information and phase information includes means to obtain amplitude and phase difference information between combinations of two of said multiplicity of acoustic receivers.

15. A sensing means as in claim 14 wherein said means to obtain amplitude and phase difference information includes electrical means for subtracting electrical signals between said two of said multiplicity of acoustic receivers.

16. A sensing system as in claim 1 wherein said means for processing includes means to obtain combinations of amplitude and phase information from several separate locations which employ acoustic transduction means for transmitting acoustic wave energy from said several separate locations.

17. A sensing system as in claim 16 wherein said means to obtain combinations of amplitude and phase information includes means to obtain amplitude and phase difference information between combinations of two of said several locations.

18. A sensing system as in claim 17 wherein said means to obtain amplitude and phase difference information includes differential acoustic receiver means which detect amplitude and phase difference information between combinations of two of said several separate locations.

19. The method of determining a spatial dimension including shape, velocity and position of an object relative to a fixed point in space which comprises positioning a source of acoustic energy at said fixed point, said source generating a substantially single frequency, constant amplitude continuous wave (CW) acoustic signal to irradiate the object, said continuous wave (CW) acoustic signal being focused predominantly on one portion of said object; positioning a plurality of acoustic detectors adjacent to said source, said detectors being laterally spaced from each other and from said source to detect said acoustic wave energy interacting with said object by reflection and refraction of said single frequency acoustic wave therefrom, converting said detected acoustic wave energy from each of said detectors to a separate electrical signal representative of the amplitude and phase of said detected acoustic wave at the position of each of said detectors and relative to said fixed point, and combining said electrical signals to generate a single combined signal or quantity representative of a selected spatial dimension of shape, velocity and position of said object relative to said fixed point.

20. A sensing system as in claim 1 which includes means for reducing multiple reflections of said acoustic wave energy between objects in said sensing region.

21. A sensing system as in claim 20 wherein said means for reducing multiple reflections includes acoustic damping material for absorbing acoustic wave energy reflected or diffracted from said object.

22. A sensing system as in claim 20 wherein said means for reducing multiple reflections includes angled surfaces for diverting acoustic wave energy reflected or diffracted from said object away from said objects.

23. A sensing system as in claim 1 that includes means to cause flow of the medium in said sensing region through which said wave energy is transmitted.

24. A sensing system as in claim 23 that includes control means operable to hold fixed at least one of the properties of said medium.

25. A sensing system as in claim 24 wherein said property is the temperature of said medium.

26. A sensing system as in claim 1 wherein changes in at least one of the properties of the medium in said sensing region through which said wave energy is transmitted are compensated for by changing said single frequency of continuous wave transductions.

27. A sensing system as in claim 1 that includes temperature control means operable to hold fixed the temperature of said multiplicity of acoustic receivers.

28. A method of guiding parts-manipulative equipment in an unstructured environment, that comprises:
 transmitting continuous acoustic wave energy through a gas medium at a single frequency, which acoustic wave energy interacts with objects in a sensing region, the transmitted wave energy being focused on a point or portion of the sensing region;
 detecting said acoustic wave energy with a multiplicity of acoustic receivers; and
 obtaining at least one of electrical amplitude information and phase information of said multiplicity of acoustic receivers to direct the guidance of said parts-manipulation equipment.

29. A method as claimed in claim 28 that includes combining the amplitude information and the phase information and that further includes subtracting phase information from the amplitude information and the phase information of each of the multiplicity of acoustic receivers to enhance the guiding of said parts-manipulative equipment.

30. A method as claimed in claim 29 that includes determining phase information from the geometry of said multiplicity of acoustic receivers, said method including changing the point or portion of the sensing region on which the transmitted acoustic wave energy is focused to derive said information from a plurality of places in the sensing region.

31. A method as claimed in claim 29 wherein said combining of the amplitude information and the phase information includes repetitive subtracting of predetermined phase information from the amplitude and phase information of each of the multiplicity of acoustic receivers.

32. An acoustic system that comprises:
 means for transmitting acoustic wave energy at a very narrow frequency band, which acoustic wave energy, in an operating system, interacts with an object in a sensing region to provide scattered wave energy, said means for transmitting being operable to focus the transmitted acoustic wave energy on a portion of the sensing region;
 sensing means comprising a plurality of acoustic transducers positioned to receive the scattered wave energy, each transducer being operable to convert the received acoustic wave energy to an electrical signal;
 means for processing connected to receive the electrical signals from the plurality of acoustic transducers and operable to obtain at least one of amplitude and phase information with respect to the electrical signal from each said transducer; and
 means for combining the at least one of amplitude and phase information from each of the plurality of transducers to derive at least one of shape, position and orientation data with respect to said object, said data being in the form of a single signal derived by combining the at least one of amplitude and phase information from each transducer with the at least one of amplitude and phase information of the other transducers of said plurality of acoustic transducers.

33. A method of providing a measurement of a geometric parameter of an object disposed in a gaseous medium that comprises:
 directing outgoing acoustic wave energy at a very narrow band of frequencies upon the object which reflects the same and detecting at a multiplicity of places incoming acoustic wave energy from the object, the outgoing acoustic wave energy being focused at a point on the object; and
 combining the information in the incoming acoustic wave energy from the point to provide a measure of said geometric parameter as a combined signal having a single value representative of at least one of amplitude and phase of the incoming acoustic wave energy from said point.

34. A method according to claim 33 in which the outgoing acoustic wave energy is provided by an array of acoustic transmitters, in which the distance separating the object and the array is no more than about ten times the distance between the outermost ends of the array, and which includes use of geometry or triangulation to derive the distance between the object and the array.

35. A method according to claim 33 in which the outgoing acoustic wave energy is focused on each point of many different points to derive information with respect to many points on the object and in which said combined signal is obtained for said each point.

36. A method according to claim 35 in which the outgoing acoustic wave energy is provided by phased-array transducers adapted to focus the outgoing acoustic wave energy at said point and in which the distance between the phase array transducers and the object is no more than about ten times the distance between the outermost ends of the array.

37. A method according to claim 35 in which the incoming acoustic wave energy is also focused with respect to said point such that said combined signal is enhanced by focusing the outgoing wave energy at said point and receiving only wave energy emanating from said point.

38. A method according to claim 33 in which the incoming acoustic wave energy is also focused with respect to said point.

39. A method according to claim 38 in which the incoming acoustic wave energy is received by phased-array transducers adapted to focus the incoming acoustic wave energy with respect to the point and in which the distance between the phased-array transducers and the object is not more than about ten times the distance between the outermost of the array.

40. A method according to claim 33 in which focusing is achieved by constructive interference between the waves of the acoustic wave energy.

41. A method according to claim 33 in which the combined signal is derived from the expression $A_{tot} \sin(\omega t + \phi_{tot})$, where $$A_{tot}\sin(\omega t + \phi_{tot}) = \sum_{i=1}^{n} W_i A_i \sin(\omega t + \phi_i + \theta_i),$$

where
- $W_i$ is a weighting factor,
- $A_i$ is the amplitude of the acoustic wave energy received by each receiver of the multiplicity of receivers,
- $\phi_i$ is a focus phase shift in the acoustic wave energy,
- $\omega$ is the frequency of the acoustic wave energy,
- t is time,
- $\theta_i$ is the phase of the acoustic wave energy received by each receiver of the multiplicity of acoustic receivers,
- $\phi_{tot}$ is the combined phase signal, and
- $A_{tot}$ is the combined amplitude signal.

42. A method according to claim 41 which includes using a differential phase measurement technique in determining said geometric parameter of the object.

* * * * *